United States Patent

[11] 3,586,935

| [72] | Inventors | Oscar E. Lundelius, Sr.<br>3026 Underwood, Houston, Tex. 77025;<br>John G. Tittle, Sr., 217 Queens Road,<br>Pasadena, Tex. 77502 |
|---|---|---|
| [21] | Appl. No. | 790,046 |
| [22] | Filed | Jan. 9, 1969 |
| [45] | Patented | June 22, 1971 |

[54] SPEED REGULATING AND CONTROL SYSTEM FOR PLURAL-PHASE-WOUND-ROTOR INDUCTION MOTORS
6 Claims, 7 Drawing Figs.

[52] U.S. Cl. .................................................. 318/49,
318/197, 318/237
[51] Int. Cl. ...................................................... H02k 17/34
[50] Field of Search ........................................... 318/46, 49,
197, 237

[56] References Cited
UNITED STATES PATENTS
2,359,145  9/1944  Myers ........................... 318/46

3,375,433  3/1968  Haggerty ....................... 318/237

Primary Examiner—Oris L. Rader
Assistant Examiner—Gene Z. Rubinson
Attorneys—Jack W. Hayden and Richard E. Bee ABSTRACT: A motor control system for controlling the speed of a three-phase wound-rotor induction-type electric motor. Silicon controlled rectifiers are connected in circuit with the rotor windings of the motor for controlling the current flow therein. A control circuit is connected to the gate electrode of each of the silicon controlled rectifiers for firing same. These control circuits are responsive to the rotor winding voltages for determining the phase angles at which the silicon controlled rectifiers are fired. This control action acts to hold the motor speed constant under varying load conditions. Adjustable bias circuit means are connected to each of the control circuits for changing the basic operating speed of the motor.

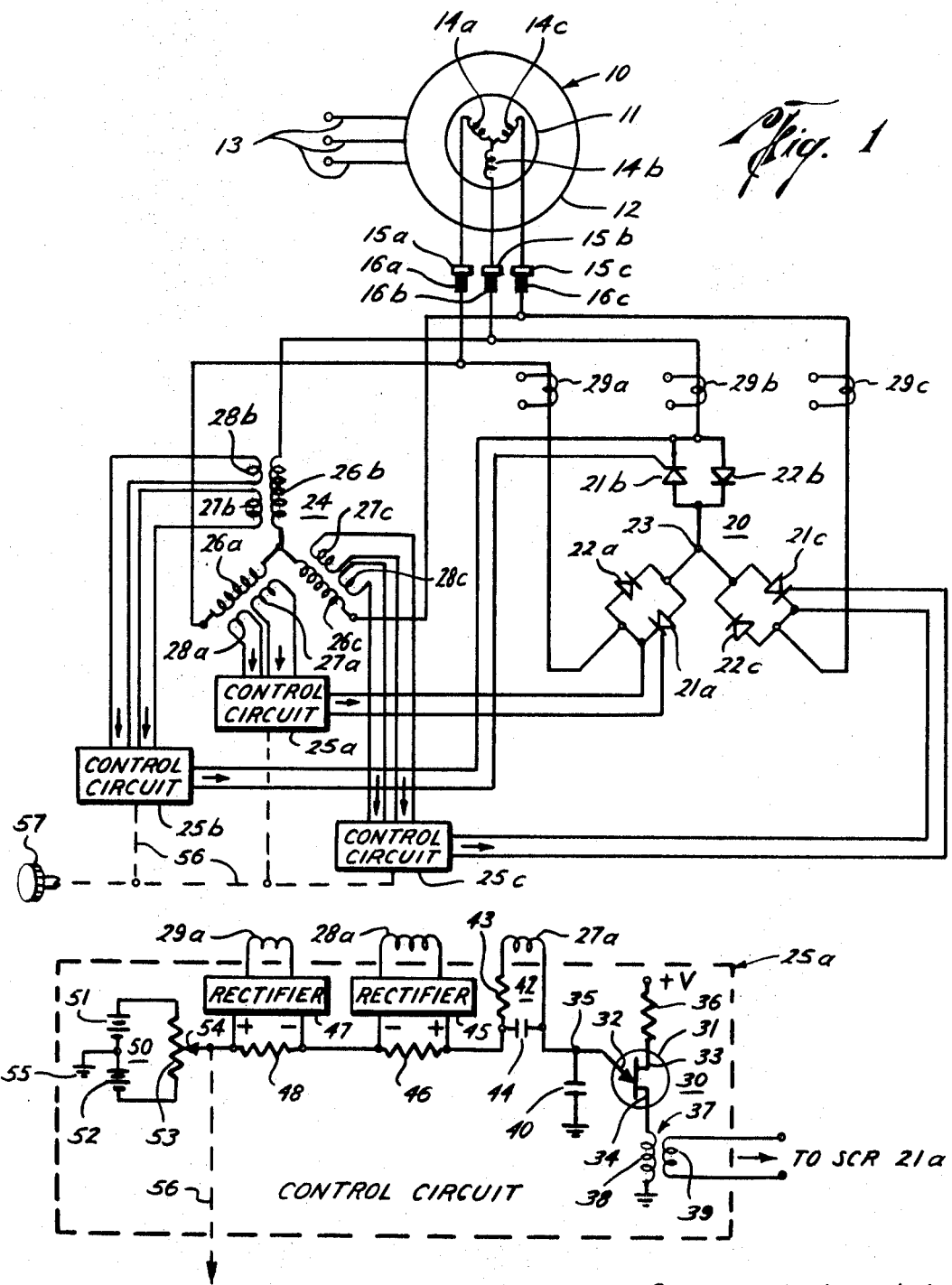

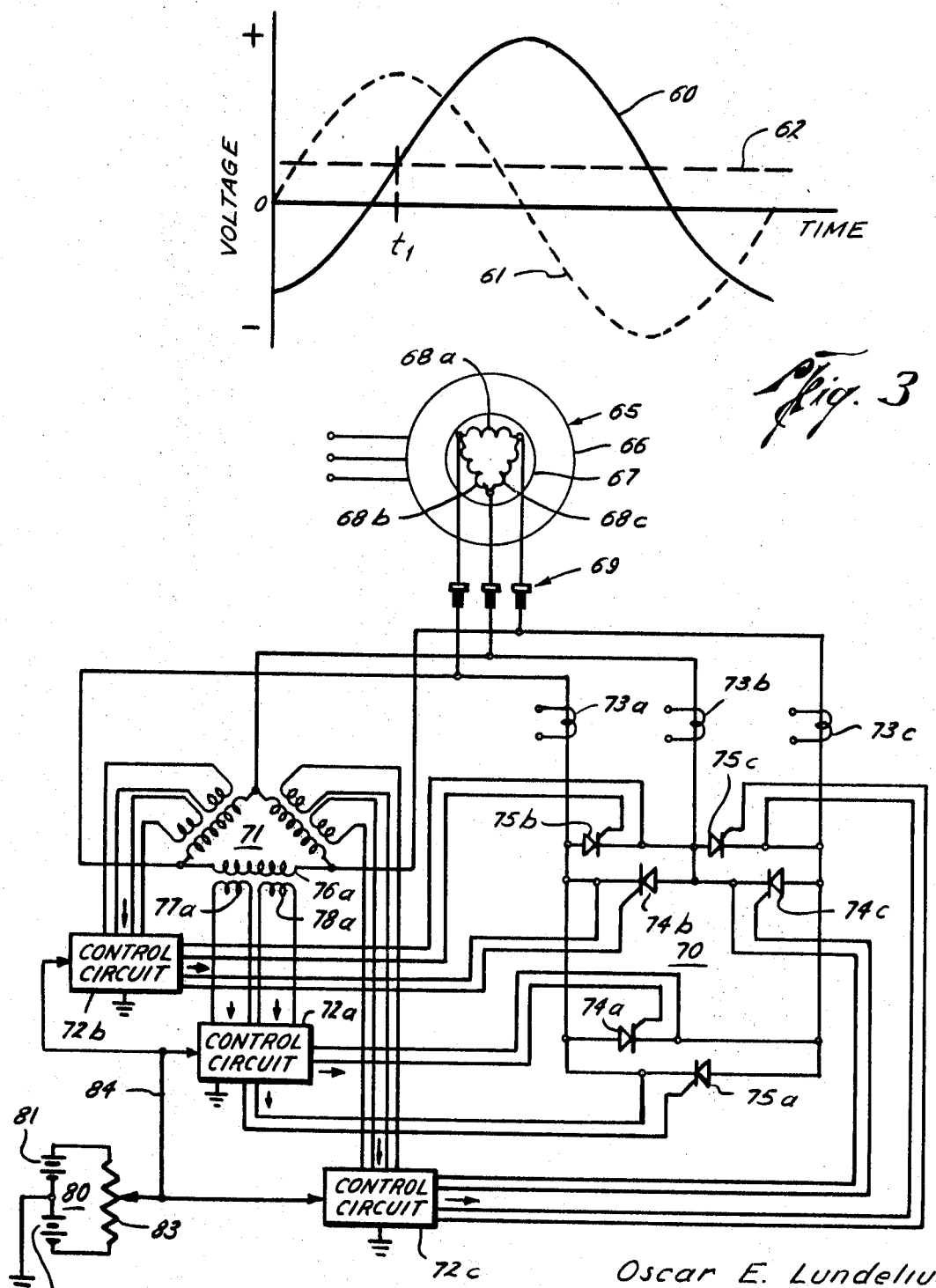

Oscar E. Lundelius, Sr.
John G. Tittle, Sr.
INVENTORS

BY

Hayden Pravel Wilson & Matthews
ATTORNEYS 3,586,935

SPEED REGULATING AND CONTROL SYSTEM FOR PLURAL-PHASE-WOUND-ROTOR INDUCTION MOTORS

BACKGROUND OF THE INVENTION

This invention relates to electrical circuits and systems for controlling the operating speeds of wound-rotor alternating-current electric motors.

Various systems have been heretofore proposed for controlling the speed of wound-rotor alternating-current electric motors. Some of these systems accomplish this purpose by varying the magnitude of the energizing voltage supplied to the primary or stator windings of the motor. Others accomplish this purpose by varying the frequency of the energizing voltage supplied to the stator windings. Some of these systems provide means which are basically nothing more than means for manually changing the speed of the motor. Other of these systems are such that they also tend to hold the motor speed constant at any given speed setting.

These latter systems usually include a tachometer device which is mechanically coupled to the rotating shaft of the motor for developing an electrical signal which is proportional to the motor speed. This signal is then compared with a reference signal to produce a correction signal which is supplied to the circuit which is controlling the magnitude or frequency of the stator winding energizing voltage. The control action is such as to hold the motor speed at the value established by the reference signal. The speed setting is changed by changing the value of the reference signal.

These previously proposed systems have various disadvantages. Some are relatively inefficient. Some require the use of additional devices such as tachometers, rotating frequency sources and so forth. Some do not perform very satisfactorily under varying load conditions. Some are rather cumbersome and relatively expensive. Some do not hold up well when used in a rugged operating environment. And some suffer from two or more of these disadvantages.

SUMMARY OF THE INVENTION

It is an object of the invention, therefore, to provide a new and improved motor control system for plural-phase wound-rotor alternating-current motors which is capable of holding the motor speed relatively constant under a relatively wide range of load conditions for any given speed setting with an improved degree of accuracy.

It is another object of the invention to provide a new and improved motor control system for accurately controlling the speed of a plural-phase wound-rotor induction motor without the use of a tachometer device.

It is a further object of the invention to provide a new and improved motor control system for simultaneously operating a plurality of wound-rotor induction motors at the same speed.

In accordance with the invention, there is provided a motor control system for controlling the speed of a plural-phase wound-rotor induction motor having a plurality of stator and rotor windings. The motor control system includes silicon controlled rectifier means coupled to the rotor windings for controlling current flow therein. The motor control system also includes control circuit means responsive to the rotor winding voltages for controlling the operation of the silicon controlled rectifier means for controlling the speed of the motor.

For a better understanding of the present invention, together with other and further objects and features thereof, reference is had to the following description taken in connection with the accompanying drawings, the scope of the invention being pointed out in the appended claims.

BRIEF DESCRIPTION OF THE DRAWINGS

Referring to the drawings:

FIG. 1 is a circuit diagram, partly schematic, of a first embodiment of a motor control system constructed in accordance with the present invention;

FIG. 2 is a circuit diagram of one of the control circuits used in the FIG. 1 embodiment;

FIG. 3 is a graph of voltage waveforms used in explaining the operation of the FIG. 1 embodiment;

FIG. 4 is a circuit diagram of a second embodiment of a motor control system constructed in accordance with the present invention;

DESCRIPTION OF THE FIRST EMBODIMENT

Figure 5:
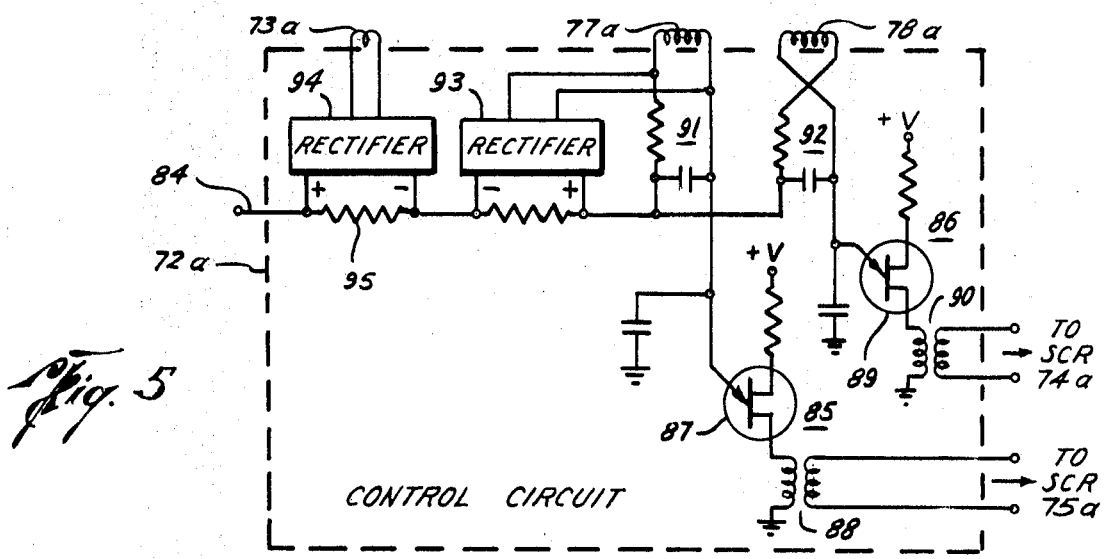
FIG. 5 is a circuit diagram of one of the control circuits used in the FIG. 4 embodiment.

Referring to FIG. 1, there is shown a motor control system for controlling the speed of a three-phase wound-rotor induction motor 10. The motor 10 includes a rotor 11 and a stator 12. The stator 12 includes three primary or stator windings (not shown) which, in the present embodiment, are connected in a "wye" configuration. These stator windings are energized by connecting three lead wires 13 running therefrom to a suitable source of three-phase alternating-current electrical power. The rotor 11 includes three secondary or rotor windings 14a, 14b and 14c which, in the present embodiment, are also connected in a "wye" configuration. The rotor shaft (not shown), extending from the end of the rotor 11 is coupled to the mechanical load to be driven by the motor 10.

The free ends of the rotor windings 14a, 14b and 14c are connected to separate rotor slip rings 15a, 15b and 15c, respectively. Slip rings 15a, 15b and 15c are contacted by stationery brushes 16a, 16b and 16c, respectively. In practice, the slip rings 15a, 15b and 15c are mounted on the shaft of the rotor 11, while the stationery brushes 16a, 16b and 16c are mounted on the stator 12 adjacent to and in sliding engagement with such slip rings.

The motor control system of this embodiment includes controllable impedance means in the form of a current control circuit 20 which is coupled to the rotor windings 14a, 14b and 14c for varying the impedance in circuit which such windings and, hence, the current flow through such windings. The current control circuit 20 is of a "wye" configuration. A first arm of the wye includes a silicon controlled rectifier (SCR) 21a and an ordinary type of semiconductor diode 22a connected in parallel therewith. The anode of the silicon controlled rectifier 21a is connected to the neutral point or center point 23 of the wye, while the cathode of the silicon controlled rectifier 21a is connected by way of the brush 16a and slip ring 15a to the free end of the rotor winding 14a. The semiconductor diode 22a is connected in an opposite polarity manner, its anode being connected to the brush 16a and its cathode being connected to the neutral point 23. A second arm of the wye-connected circuit 20 includes a second silicon controlled rectifier (SCR) 21b and a second semiconductor diode 22b connected in parallel with one another in an opposite polarity manner. These second circuit elements are connected between the neutral point 23 and the rotor brush 16b. The third arm of the wye-connected circuit 20 include a third silicon controlled rectifier (SCR) 21c and a third semiconductor diode 22c connected in parallel with one another in an opposite polarity manner. These third circuit elements are connected between the neutral point 23 and the third rotor brush 16c.

The motor control system of the present embodiment further includes control means responsive to the rotor winding voltages for controlling the operation of the controllable impedance means represented by the current control circuit 20 and, more particularly, the operation of the silicon controlled rectifiers 21a, 21b and 21c included in such circuit 20. This voltage responsive control circuit means includes a wye-connected voltage transformer 24 and three control circuits 25a, 25b and 25c. The voltage transformer 24 includes three wye-connected primary windings 26a, 26b and 26c, the free ends of which are connected to the rotor brushes 16a, 16b and 16c, respectively. Coupled to the first primary winding 26a is a pair of secondary windings 27a and 28a the leads of which are connected to the control circuit 25a. Coupled to the second primary winding 26b is a pair of secondary windings 27b and 28b the leads of which are connected to the control circuit 25b. Coupled to the third primary winding 26c is a pair of secondary windings 27c and 28c the leads of which are connected to the third control circuit 25c. The output leads of the first control circuit 25a are connected to the gate electrode and the cathode of the first silicon controlled rectifier 21a, while the output leads of the second control circuit 25b are connected to the gate electrode and the cathode of the second silicon controlled rectifier 21b and the output leads of the third control circuit 25c are connected to the gate electrode and the cathode of the third silicon controlled rectifier 21c.

Individual current transformers 29a, 29b and 29c are provided for sensing the magnitude of the current flowing in each of the rotor windings 14a, 14b and 14c, respectively. These current transformers 29a, 29b and 29c are individually coupled to the appropriate ones of the conductors running between the three arms of the current control circuit 20 and the rotor brushes 16a, 16b and 16c.

Referring now to FIG. 2, there is shown in greater detail the internal construction of one of the control circuits 25a, 25b and 25c. Each of these control circuits 25a, 25b and 25c is of identical construction. FIG. 2 shows the construction of the first control circuit 25a. This control circuit 25a includes a trigger circuit 30 which includes a unijunction transistor 31 having an emitter electrode 32 and a pair of base electrodes 33 and 34. The emitter electrode 32 is connected to an input terminal 35 of the trigger circuit 30. The upper base electrode 33 is connected by way of a load resistor 36 to a source of direct-current supply voltage +V. The lower base electrode 34 is connected by way of a pulse transformer 37 to a circuit ground point. Transformer 37 includes a primary winding 38 and a secondary winding 39. The secondary winding 39 constitutes the output of the control circuit 25a and, as such, is connected to the silicon controlled rectifier 21a. A filter capacitor 40 is connected between the trigger circuit input terminal 35 and circuit ground.

The control circuit 25a further includes a phase shift circuit 42 which is coupled between the voltage transformer secondary winding 27a and the input terminal 35 of the trigger circuit 30. This phase shift circuit 42 includes a resistor 43 and a capacitor 44. As such, it is constructed to provide a 90° phase shift between the voltage across the rotor winding 14a and the alternating-current voltage signal which is supplied to the input terminal 35 by the phase shift circuit 42. As will be seen, the output side of the phase shift circuit 42 is connected in series in a series circuit which runs between the trigger circuit input terminal 35 and a circuit ground point.

The control circuit 25a also includes a first rectifier circuit 45 which is coupled between the voltage transformer secondary winding 28a and a rectifier output resistor 46 for purposes of supplying a direct-current control signal to the input terminal 35. The rectifier output resistor 46 is connected in series in the series circuit running between the input terminal 35 and circuit ground. The positive polarity output terminal of the rectifier 45 is connected to the end of the resistor 46 which is nearer the input terminal 35 of the trigger circuit 30.

The control circuit 25a further includes a second rectifier circuit 47 which is connected between the current transformer winding 29a and a rectifier output resistor 48 for purposes of preventing excessive motor acceleration. The resistor 48 is connected in series in the series circuit running between the input terminal 35 and circuit ground. The negative polarity output terminal of the rectifier 47 is connected to the end of the resistor 48 nearer the input terminal 35. Thus, the output connections of the rectifiers 45 and 47 are of opposite polarity relative to the trigger circuit input terminal 35.

The control circuit 25a further includes an adjustable bias circuit 50 formed by a pair of batteries 51 and 52 connected in series with a potentiometer 53. Potentiometer 53 includes an adjustable contact brush 54. The midpoint between batteries 51 and 52 is connected to a circuit ground point as indicated at 55. The bias circuit 50 is thus connected in series in the series circuit running from the input terminal 35 and the circuit ground point 55.

As previously indicated, each of the other two control circuits 25b and 25c is of an identical form of construction. The adjustable contact brush 54 of the first control circuit 25a (FIG. 2) is mechanically ganged to the adjustable contact brushes of corresponding bias circuits in each of the other control circuits 25b and 25c, this mechanical linkage being represented by dash line 56. As indicated in FIG. 1, a master control knob 57 is associated with the linkage 56 for enabling simultaneous adjustment of all three contact brushes.

OPERATION OF THE FIRST EMBODIMENT

Considering now the operation of the motor control system illustrated in FIGS. 1 and 2, it is assumed that the stator winding leads 13 are connected to a suitable source of electric power. This energizes the stator windings which in turn, induces current flow in the rotor windings 14a, 14b and 14c. Interaction between the magnetic fields produced by the currents in the rotor and stator windings produces mechanical rotation of the rotor 11.

Current flow in the rotor windings 14a, 14b and 14c is controlled by the current control circuit 20. More particularly, diodes 22a, 22b and 22c permit current flow in one direction through their respective rotor windings 14a, 14b and 14c, while the silicon controlled rectifiers 21a, 21b and 21c, when conductive, permit current flow in the opposite direction through their respective rotor windings 14a, 14b and 14c. By turning on the silicon controlled rectifiers 21a, 21b and 21c for different lengths of time, the fraction of each cycle during which current flows through the rotor windings 14a, 14b and 14c may be varied to thereby vary the average torque produced on the rotor 11 and thereby vary the speed of rotation of the rotor 11.

Each of the control circuits 25a, 25b and 25c, together with its portion of the voltage transformer 24, serves to sense both the frequency and the magnitude of the voltage induced in the rotor winding to which it is coupled. Each of the control circuits 25a, 25b and 25c uses the sensed parameters to control the firing of the silicon controlled rectifier to which it is connected to thereby control the fraction of each half cycle during which such silicon controlled rectifier is conductive. This feedback action is such as to keep the rotational speed of the rotor 11 constant under varying mechanical load conditions.

Both the frequency and the magnitude of the voltage induced in each of the rotor windings 14a, 14b and 14c varies inversely with respect to the speed of rotation of the rotor 11. When the rotor 11 is standing still, the motor 10 behaves like an ordinary transformer. The frequency of the rotor voltage is at a maximum which is equal to the frequency of the alternating-current power which is supplied to the stator leads 13. The magnitude of the rotor voltage is also a maximum and is determined by the turns ratio of the stator windings to the rotor windings.

As the speed of the rotor 11 increases, it approaches the synchronous speed, this being the speed or rotation of the rotating magnetic field produced by the stator windings. As the rotor speed reaches very nearly the synchronous speed, the rotor 11 stays very nearly in step with the rotating magnetic field and, hence, very little voltage is induced in the rotor windings 14a, 14b and 14c, (the rate of cutting flux lines is small). At this time, both the frequency and the magnitude of the rotor voltages are relatively small and are approaching zero. They do not reach zero because the rotor cannot completely reach the synchronous speed. This is because a small amount of slip is required in order to produce enough torque to overcome the frictional losses and to keep the rotor rotating.

Considering first the control circuit 25a, the unijunction transistor 31 located therein can be considered as being normally nonconductive. This unijunction transistor 31 will become conductive and produce a sudden pulse of current flow from base electrode 33 to base electrode 34 when the signal level at the emitter electrode 32 exceeds a predetermined threshold level. This pulse is supplied by the pulse transformer 37 to the silicon controlled rectifier 21a to trigger or fire such silicon controlled rectifier. Various alternating-current and direct-current signal components are supplied to the emitter electrode 32 by means of the various circuit elements connected in the series circuit running from the trigger circuit input terminal 35 to the circuit ground point 55.

The phase shift circuit 42 supplies a first of these signal components to the emitter electrode 32. The signal supplied by this phase shift circuit 42 is represented by waveform 60 of FIG. 3. It is an alternating-current signal of approximately sinusoidal waveform. It corresponds to the voltage developed across the rotor winding 14a, except that it is shifted in phase by 90° relative to the rotor winding voltage. The voltage across the rotor winding 14a is represented by waveform 61 of FIG. 3. The alternating-current signal represented by waveform 60 is used to trigger the unijunction transistor 31 at some point during each cycle of the rotor winding voltage (waveform 61). The threshold level for the unijunction transistor 31 is represented by dash line 62 in FIG. 3. In this example, the alternating-current signal of waveform 60 triggers the unijunction transistor 31 at time $t_1$, this being the time at which the alternating signal of waveform 60 exceeds the threshold level 62. This occurs at a phase angle of 90° taken with respect to the rotor winding voltage of waveform 61.

Several features should be noted concerning the use of the alternating-current waveform 60 to trigger the unijunction transistor 31. For one thing, the use of the 90° phase shift between the rotor voltage and the alternating-current triggering signal causes the triggering point to occur over the steeply rising portion of the triggering signal waveform. This provides a sharp and well defined triggering point. Another feature is the fact that this alternating-current triggering signal takes into account the change in the frequency of the rotor winding voltage as the speed of the rotor changes. In particular, if the frequency of the rotor winding voltage changes, then the frequency of the alternating-current triggering signal changes in a like manner because of the face that it is derived from the rotor winding voltage. Also, the 90° phase relationship between the triggering signal and the rotor voltage remains unchanged even though the frequency is changed. Thus, changes in frequency of the rotor voltage do not, of themselves, change the relative timing of the triggering of the unijunction transistor 31.

A further feature concerns the magnitude or amplitude of the alternating-current triggering signal represented by waveform 60. The particular 90° phase shift circuit 42 used in this embodiment is a resistor-capacitor (RC) type of phase shift circuit. It is known that the output signal amplitude with this type of a phase shift circuit will fall off or decrease as the frequency of the input signal thereto increases. In the present system, this decrease in amplitude is offset by the increase in amplitude of the rotor winding voltage, which increase is occurring at the same time and in step with the increase in frequency of the rotor voltage. As a consequence, the alternating-current triggering signal undergoes very little change in amplitude as the rotor voltage frequency varies.

A second signal component supplied to the emitter electrode 32 of the unijunction transistor 31 is the direct-current control signal component produced by the rectifier 45. This direct-current control signal is proportional to the peak amplitude or peak magnitude of the alternating-current voltage developed across the rotor winding 14a. As a consequence, this direct-current control signal varies in inverse proportion to the rotational speed of the rotor 11. This direct-current control signal serves to raise or lower the position of the alternating-current triggering signal relative to the threshold level of the transistor 31 and, hence, to advance or retard the phase angle (taken relative to the rotor winding voltage) at which the transistor 31 is fired.

The nature of the control action provided by this direct-current control signal is such as to hold the speed of the motor 10 relatively constant under varying load conditions. Assume, for example, that the mechanical load being driven by the shaft of the rotor 11 suddenly increases and momentarily reduces the speed of the rotor 11. This increases the amplitude of the voltage developed across the rotor winding 14a. This, in turn, increases the magnitude of the direct-current control signal appearing at the output of the rectifier 45. In terms of the waveforms of FIG. 3, this moves the alternating-current triggering signal of waveform 60 in an upwardly direction. This, in turn, advances the phase angle at which the alternating-current triggering signal of waveform 60 crosses the unijunction transistor threshold level 62. Thus, both the unijunction transistor 31 and the silicon controlled rectifier 21a are fired at an earlier point in the rotor voltage cycle. Consequently, current flows through the rotor winding 14a for a greater fraction of the rotor voltage cycle. This increases the effective torque on the rotor 11 and, hence, increases the speed of the rotor 11 so as to make up for the previous decrease in speed. (Bear in mind that the other two control circuits 25b and 25c and their silicon controlled rectifiers 21b and 21c are also behaving in a similar manner during their rotor voltage cycles.)

If, on the other hand, the mechanical load should decrease and thereby cause the rotor speed to increase, then a converse type of action occurs. The end result is to retard the phase angle at which the silicon controlled rectifier 21a is fired and, hence, to decrease the effective torque on the rotor 11.

The adjustable bias circuit 50 of FIG. 2 functions to supply an adjustable direct-current bias signal component to the emitter electrode 32 of the unijunction transistor 31. By changing the magnitude of this bias signal, the basic or nominal operating speed of the motor 10 is changed. In other words, the bias signal provided by the bias circuit 50 controls the particular speed which the direct-current control signal developed by rectifier 45 thereafter seeks to hold constant.

The control circuit 25a further includes a second rectifier circuit 47, the input of which is connected to the current transformer 29a and, hence, is responsive to the magnitude of the current flowing in the rotor winding 14a. The purpose of the rectifier 47 is to develop an opposite polarity direct-current signal component for preventing excessive acceleration of the rotor 11 and, hence, overheating of or damage to the motor 10. The parameters of the current transformer 29a and the rectifier 47 are such that, for constant motor speeds or small amounts of acceleration, the direct-current signal appearing at the output of the rectifier 47 is relatively small and has little effect on the operation of the control circuit 25a. If, however, the acceleration of the rotor 11 becomes relatively large, then this direct-current component increases to a relatively large value. Being of opposite polarity to the control signal produced by the rectifier 45, the signal from rectifier 47 operates to retard the phase angle at which the silicon controlled rectifier 21a is fired and, hence, to decrease the torque on the rotor 11.

The other two control circuits 25b and 25c (FIG. 1) operate in a similar manner to control the firing angles of the silicon controlled rectifiers 21b and 21c to which they are respectively connected. The firing angles of the three silicon control rectifiers 21a, 21b and 21c are, of course, spaced apart by a factor of 120° relative to one another, this being the relative phase difference between the voltages developed across the three rotor windings 14a, 14b and 14c.

As indicated in FIG. 1, the basic operating speed of the motor 10 may be changed by means of the control knob 57 which acts to simultaneously adjust the bias signals provided by the bias circuits in each of the control circuits 25a, 25b, and 25c. In most cases, the bias signals in the different control circuits 25a, 25b and 25c should be kept approximately equal to one another, though slight differences may be deliberately introduced to compensate for minor differences in the operating characteristics of the different unijunction transistors or other components.

DESCRIPTION OF THE SECOND EMBODIMENT

Referring to FIG. 4 of the drawings, there is shown a wound-rotor induction motor 65 wherein the rotor and stator windings are connected in a delta configuration. Motor 65 includes a stator 66 and a rotor 67. The rotor windings are indicated at 68a, 68b and 68c. Suitable slip rings and brushes for making connection with these rotor windings 68a, 68b and 68c are indicated at 69. A delta-connected current control circuit 70 serves to control the current flow through the rotor windings 68a, 68b and 68c. A delta-connected voltage transformer 71 together with a trio of control circuits 72a 72b and 72c operate to sense the rotor winding voltages and in response thereto to trigger the various current control devices included in the current control circuit 70. A trio of current transformers 73a, 73b and 73c are provided for sensing the rotor winding currents.

As is seen in FIG. 4, the current control devices in each leg of the delta-connected current control circuit 70 include a pair of oppositely-poled silicon controlled rectifiers. Thus, the first leg contains silicon controlled rectifiers 74a and 75a, while the second leg contains silicon controlled rectifiers 74b and 75b and the third leg includes silicon controlled rectifiers 74c and 75c. One silicon controlled rectifier of each pair (e.g., 74a) controls the rotor current flow in one direction, while the other silicon controlled rectifier of each pair (e.g., 75a) controls the current flow in the other direction. The fractions of their respective half cycles during which the two silicon controlled rectifiers of any given pair are turned on is determined by trigger pulses supplied by the corresponding one of the control circuits 72a, 72b and 72c.

Each leg of the voltage transformer 71 includes a primary winding which is coupled by way of a pair of secondary windings to one of the control circuits 72a, 72b and 72c. By way of example, a first leg of the transformer 71 includes a primary winding 76a which is coupled by way of secondary windings 77a and 78a to the control circuit 72a. A common adjustable bias circuit 80 is provided for the three control circuits 72a, 72b and 72c. This bias circuit 80 includes batteries 81 and 82 and potentiometer 83.

Referring to FIG. 5, there are shown the details of the control circuit 72a. Each of the other control circuits 72b and 72c is of the same construction. The control circuit 72a is generally similar to the control circuit 25a considered in connection with FIG. 2 of the first embodiment with certain exceptions. In the first place, since the control circuit 72a of FIG. 5 is controlling a pair of silicon controlled rectifiers 74a and 75a, it includes a pair of trigger circuits 85 and 86. Trigger circuit 85 includes a unijunction transistor 87 and an output pulse transformer 88, while the second trigger circuit 86 includes a unijunction transistor 89 and an output pulse transformer 90. The pulse transformers 88 and 90 are connected to the silicon controlled rectifiers 75a and 74a, respectively.

A pair of 90° phase shift circuits 91 and 92 is also employed, these being individually connected to the emitter electrodes of their respective unijunction transistors 87 and 89. The connection between the voltage transformer secondary winding 78a and its phase shift circuit 92 is reversed relative to the connection of the secondary winding 77a to its phase shift circuit 91. This provides an additional 180° of phase shift for the alternating-current triggering signal supplied by the phase shift circuit 92 to the unijunction transistor 89. This separates the triggering of the two unijunction transistors 87 and 89 by a phase angle of 180°. As a consequence, one of these unijunction transistors 87 and 89 is triggered during the first half of the rotor voltage cycle, while the other is triggered during the second half of the rotor voltage cycle.

A rectifier circuit 93 provides the direct-current control signal which is proportional to the peak amplitude or magnitude of the rotor winding voltage. This control signal is supplied to the emitter electrodes of each of the unijunction transistors 87 and 89. A further rectifier circuit 94 provides the opposite polarity direct-circuit signal which is proportional to the rotor winding current and which serves to prevent excessive acceleration of the rotor 67. This signal is likewise supplied to the emitter electrodes of each of the unijunction transistors 87 and 89. The direct-current bias signal which sets the basic operating speed of the motor 65 is obtained from the adjustable bias circuit 80 (FIG. 4) and is supplied over the input lead or conductor 84 to the emitter electrodes of each of the unijunction transistors 87 and 89. Since a common bias circuit 80 is used for each of the three control circuits 72a, 72b and 72c, all of these control circuits 72a, 72b and 72c are simultaneously adjusted whenever the basic operating speed of the motor is changed, such change being produced by movement of the sliding contact brush on the potentiometer 83 (FIG. 4).

If desired, the first embodiment discussed in connection with FIGS. 1 and 2 can also be modified by using a single common bias circuit for each of the three control circuits 25a, 25b and 25c in the same manner as is done for the second embodiment. As a further modification, a single common acceleration control rectifier circuit can be used to provide the direct-current signal which prevents excessive rotor acceleration for the three control circuits in either the first (FIG. 1) or the second (FIG. 4) embodiment. For example, for the second embodiment, this would mean that the rectifier 94 and its output resistor 95 would be located outside of the control unit 72a in the same manner as for the bias circuit 80 with the negative polarity end of the rectifier 94 output side being connected to each of the control circuits 72a, 72b and 72c. At the same time, the corresponding rectifiers and load resistors in the other two control circuits 72b and 72c would be omitted.

The same type of modification can also be made for the speed regulating rectifier circuits of either FIG. 1 or FIG. 4. In other words, a single common rectifier circuit and load resistor, like rectifier 45 and load resistor 46, can be used to provide the direct-current control signal for all of the control circuits 25a, 25b and 25c of FIG. 1 and similarly for FIG. 4.

It should also be noted with respect to both the first and the second embodiments that if the maximum amplitude of the rotor winding voltages or currents exceeds the voltage or current ratings of the particular silicon controlled rectifiers which are available to control the rotor currents, then this problem can be overcome by replacing each of the individual silicon controlled rectifiers by two or more silicon controlled rectifiers connected in series or in parallel or in some appropriate combination of the two.

DESCRIPTION OF THE THIRD EMBODIMENT

Figure 6:
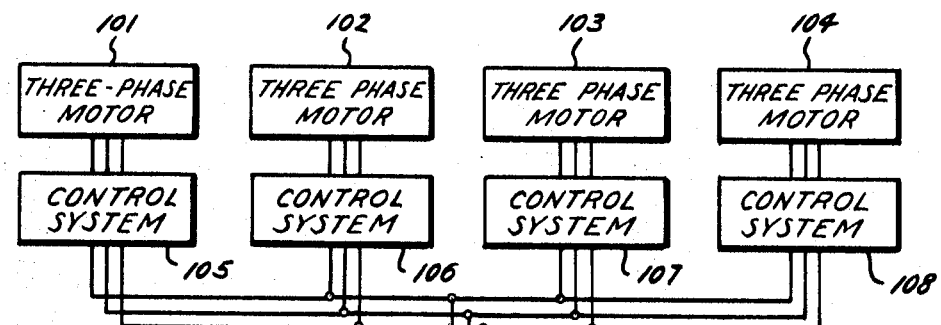
FIG. 6 is a block diagram of a third embodiment of a motor control system constructed in accordance with the present invention.

Referring to FIG. 6 of the drawings, there is shown a motor control system for controlling the speed of a plurality of three-phase wound-rotor induction motors represented by motors 101—104. (Note: A greater or lesser number of motors may be used.) Each of the motors 101—104 has associated therewith its own individual one of a plurality of motor control systems 105—108. Each of these control systems 105—108 is constructed in the manner depicted in either FIG. 1 or FIG. 4, depending on whether the motor to which it is connected is of the wye or of the delta type. Assuming the wye case, then the motor 101, for example, would correspond to the motor 10 of FIG. 1 and the control system 105 would correspond to the remainder of the circuitry as shown in FIG. 1.

In order to provide simultaneous control of the speed of all of the motors 101—104 such that their speeds are maintained equal to one another, there is provided a circuit means represented by a master oscillator 109 for supplying a common periodic reference signal to each of the control systems 105—108. This periodic reference signal, which may be of sinusoidal waveform, is supplied to the control systems 105—

108 by means of a single-phase to three-phase transformer 110. It will be recalled that each of the control systems 105—108 includes three control circuits which are operating in a three-phase manner, that is, 120° apart. This is the reason the periodic reference signal is supplied to the control systems 105—108 in a three-phase manner.

Figure 7:
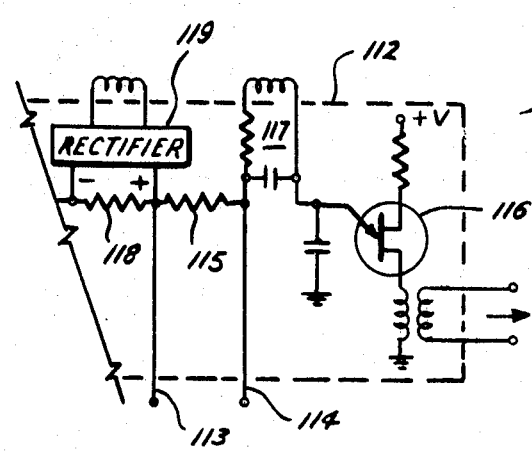
FIG. 7 is a circuit diagram showing a portion of one of the control circuits used in the FIG. 6 embodiment.

The manner of connection of the periodic reference signal to one of the control circuits located inside of the control system 105 is illustrated in FIG. 7. This is for the case where the control system 105 is of the wye type. The control circuit, only part of which is shown in FIG. 7, is identified as 112. Except for the differences to be discussed, this control circuit 112 is the same as the control circuit 25a shown in FIG. 2 and, hence, the remainder of the control circuit 112 which is not shown in FIG. 7 is constructed in the manner indicated in FIG. 2.

With reference to FIG. 7, one phase of the three-phase periodic reference signal appearing at the output of transformer 110 is coupled by way of lead wires or conductors 113 and 114 to a resistor 115 located in the control circuit 112. This resistor 115 is connected in series in the series circuit running between the emitter electrode of a unijunction transistor 116 (corresponding to unijunction transistor 31 of FIG. 2) and a circuit ground point (not shown). This adds the periodic reference signal to the remainder of the signals being supplied to the emitter electrode of the unijunction transistor 116. This reference signal, being of a periodic or alternating character, also serves to trigger the unijunction transistor 116. The action is such that this periodic reference signal takes control of the basic firing rate of the unijunction transistor 116 and hence the silicon controlled rectifier connected thereto, the motor speed adjusting itself so that the alternating-current triggering signal obtained from the rotor winding voltage (via a phase shift circuit 117) falls in step therewith. This sets the basic operating speed of the motor 101. The alternating-current triggering signal obtained from the rotor winding voltage is, of course, still effective to modify the triggering of the unijunction transistor 116 in the event that the motor speed departs from the desired basic operating value.

Since the basic motor speed is now being controlled by the periodic reference signal from the master oscillator 109, the adjustable direct-current bias circuit included in each of the control circuits is no longer used for this purpose. It is instead used to provide a trimmer type adjustment of the motor speed so that each of the various motors may be adjusted to operate at exactly the same speed for any given frequency of the periodic reference signal from the master oscillator 109.

Each of the control systems 105—108 is of a similar construction and the three-phase periodic reference signal is supplied thereto in a similar manner. Thus, all four of the motors 101—104 are operated at the same speed. The basic operating speed for the motors may be changed by changing the frequency of the periodic reference signal generated by the master oscillator 109. For this reason, the oscillator 109 is a variable frequency type of oscillator and includes a suitable control knob for changing the oscillator frequency and, hence, the speed of the motors 101—104. For the case where the motor stators are energized by alternating-current power having a frequency of 60 hertz, the master oscillator 109 may be provided with a frequency range of from 60 to 6 hertz. This would provide a motor speed range of from 0 percent to 90 percent of the maximum theoretical motor speed, namely, the synchronous speed.

The system of FIG. 6 might be used, for example, to power a multiwheeled vehicle, with each of the motors 101—104 driving a different one of the vehicle wheels. With this system, all wheels of the vehicle would be driven at the same speed at any given instant. Furthermore, this condition would be maintained even though one of the wheels should encounter greater or less resistance than the others. This is because the control system for such wheel would automatically operate to adjust the driving torque applied to such wheel so as to maintain the basic operating speed.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What we claim is:

1. A motor control system for controlling the speed of a plural-phase induction motor having a plurality of stator and rotor windings comprising:
   a plurality of silicon controlled rectifiers individually coupled to different ones of the rotor windings for controlling current flow therein;
   a plurality of trigger circuits individually coupled to different ones of the silicon controlled rectifiers for firing such silicon controlled rectifiers when the signal level at an input terminal of the corresponding one of the trigger circuits exceeds a predetermined threshold level;
   phase shift circuit means responsive to at least one of the rotor winding voltages for supplying alternating-current signals to the input terminals of the trigger circuits for triggering each trigger circuit at some point during each cycle of the voltage of the rotor winding for the corresponding silicon controlled rectifier;
   rectifier circuit means responsive to at least one of the rotor winding voltages for supplying direct-current control signals to the input terminals of the trigger circuits for determining the phase angles at which the alternating-current signals trigger such trigger circuits and thereby regulating the speed of the motor;
   and adjustable bias circuit means for supplying adjustable direct-current bias to the input terminals of the trigger circuits for establishing the nominal operating speed of the motor.

2. A motor control system for controlling the speed of a plural-phase induction motor having a plurality of stator and rotor windings comprising:
   a plurality of silicon controlled rectifiers individually coupled to different ones of the rotor windings for controlling current flow therein;
   a plurality of trigger circuits individually coupled to different ones of the silicon controlled rectifiers for firing such silicon controlled rectifiers when the signal level at an input terminal of the corresponding one of the trigger circuits exceeds a predetermined threshold level;
   phase shift circuit means responsive to at least one of the rotor winding voltages for supplying alternating-current signals to the input terminals of the trigger circuits for triggering each trigger circuit at some point during each cycle of the voltage of the rotor winding for the corresponding silicon controlled rectifier;
   rectifier circuit means responsive to at least one of the rotor winding voltages for supplying direct-current control signals to the input terminals of the trigger circuits for determining the phase angles at which the alternating-current signals trigger such trigger circuits and thereby regulating the speed of the motor;
   and second rectifier circuit means responsive to at least one of the rotor winding currents for supplying to the input terminals of the trigger circuits further direct-current signals of opposite polarity relative to the direct-current control signals for preventing excessive acceleration of the motor.

3. A motor control system for controlling the speed of a three-phase induction motor having three stator windings and three rotor windings comprising:
   at least three silicon controlled rectifiers individually coupled to different ones of the rotor windings for controlling current flow therein;
   at least three trigger circuits individually coupled to different ones of the silicon controlled rectifiers for firing such rectifiers when the signal level at an input terminal of the corresponding one of the trigger circuits exceeds a predetermined threshold level;

at least three phase shift circuit means responsive to the voltages of different ones of the rotor windings for supplying alternating-current signals to the input terminals of corresponding ones of the trigger circuits for triggering such trigger circuits at some point during each cycle of the corresponding rotor winding voltage;

rectifier circuit means responsive to at least one of the rotor winding voltages for supplying direct-current control signals to the input terminals of the trigger circuits for determining the phase angles at which the alternating-current signals trigger such trigger circuits and thereby regulating the speed of the motor;

and adjustable bias circuit means for supplying adjustable direct-current bias to the input terminals of the trigger circuits for establishing the nominal operating speed of the motor.

4. A motor control system for controlling the speed of a three-phase induction motor having three stator windings and three rotor windings comprising:

three pairs of silicon controlled rectifiers, each pair being coupled to a different one of the rotor windings for controlling current flow therein, one silicon controlled rectifier of each pair being poled for current flow in one direction and the other being poled for current flow in the other direction in the rotor winding;

six trigger circuits individually coupled to different ones of the silicon controlled rectifiers for firing such rectifiers when the signal level at an input terminal of the corresponding one of the trigger circuits exceeds a predetermined threshold level;

three pairs of phase shift circuit means, each pair being responsive to the voltage of a different one of the rotor windings for supplying alternating-current signals to the input terminals of the trigger circuits for the silicon controlled rectifiers coupled to the same rotor winding for triggering such trigger circuits at different points during each cycle of the rotor winding voltage;

rectifier circuit means responsive to at least one of the rotor winding voltages for supplying direct-current control signals to the input terminals of the trigger circuits for determining the phase angles at which the alternating-current signals trigger such trigger circuits and thereby regulating the speed of the motor;

and adjustable bias circuit means for supplying adjustable direct-current bias to the input terminals of the trigger circuits for establishing the nominal operating speed of the motor.

5. A motor control system for controlling the speed of a plurality of induction motors each having stator and rotor windings comprising:

a plurality of individual control systems each having a current control means coupled to the rotor winding of a different one of the motors for controlling current flow therein and control circuit means responsive to the rotor winding voltages of the same motor for controlling the operation of the current control means for controlling the speed of such motor;

and circuit means for supplying a common periodic reference signal to the control circuit means of each of the control systems for causing all of the motors to run at the same speed.

6. A motor control system in accordance with claim 5 wherein the reference signal circuit means includes means for varying the frequency or repetition rate of the periodic reference signal and thereby varying the operating speed of the motors.